Aug. 1, 1939.   W. W. GILBERT   2,168,201
COMBINED STEERING AND BRAKING MECHANISM
Filed April 14, 1938
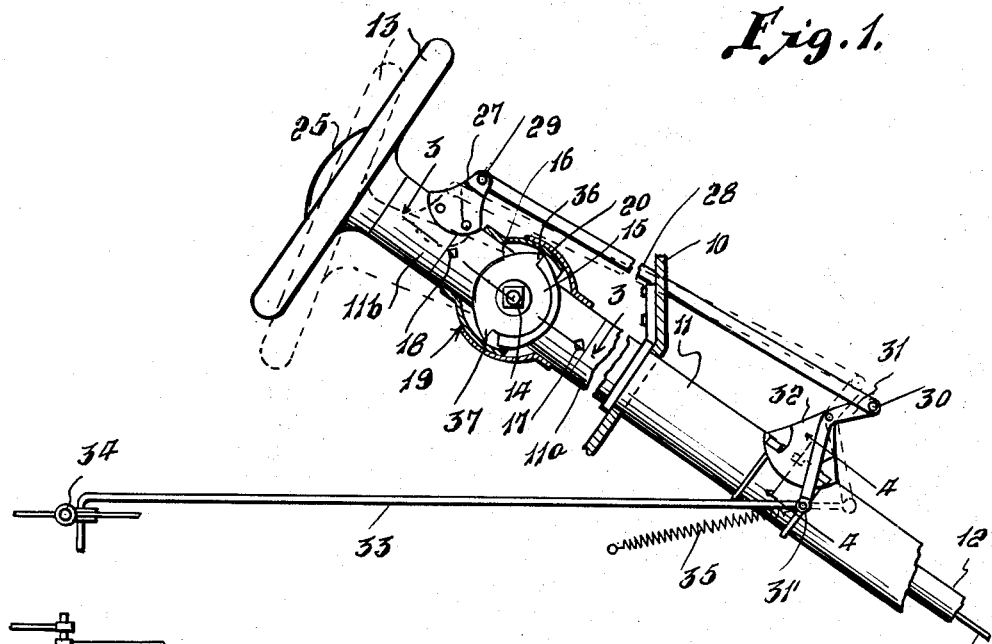
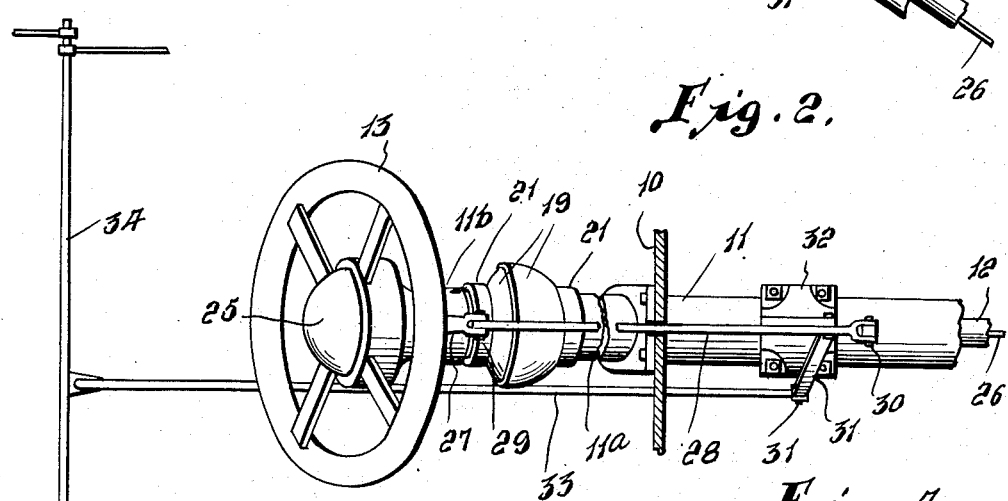
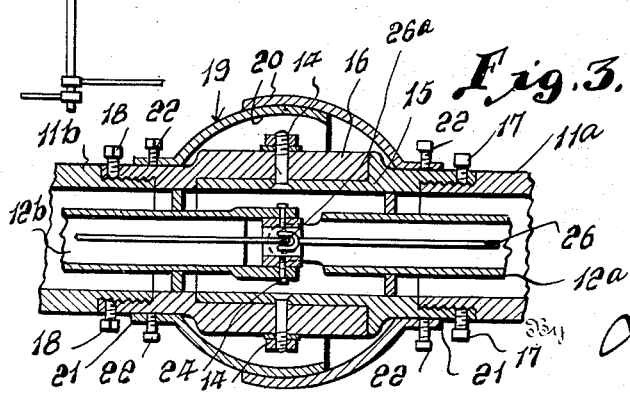
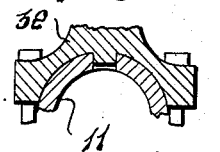
Inventor
W. W. Gilbert Patented Aug. 1, 1939

2,168,201

UNITED STATES PATENT OFFICE 2,168,201

COMBINED STEERING AND BRAKING MECHANISM

Walter W. Gilbert, Stillwater, Minn.

Application April 14, 1938, Serial No. 202,079

3 Claims. (Cl. 74—486)

This invention relates to a combined steering and braking mechanism especially for use on self-propelled vehicles and it aims to provide structure whereby the steering wheel in addition to operation to effect steering, will also control the braking mechanism of the vehicle.

It is further aimed to provide a structure wherein the steering wheel is associated with a steering column and steering post, consisting of pivotally connected parts, and connections to braking mechanism, whereby movement of the steering wheel on the pivot or axis of said parts will effect the braking operation.

The more specific objects and advantages will become apparent from a consideration of the description following taken in connection with the accompanying drawing illustrating an operative embodiment.

In said drawing—

Figure 1 is a view in side elevation, illustrating my improvements, being partly broken away;

Figure 2 is a plan view of the parts of Figure 1;

Figure 3 is an enlarged longitudinal sectional view taken substantially on the plane of line 3—3 of Figure 1, and Figure 4 is a fragmentary transverse sectional view taken on the plane of line 4—4 of Figure 1.

Referring specifically to the drawing wherein like reference characters designate like or similar parts, 10 designates the dashboard of an automobile through which the steering column 11, extends in the usual way, the steering post 12 being enclosed thereby as is usual and being rotatable therein, being connected in the usual manner to the usual steering mechanism in an automobile. At the upper end, the steering post 12 has a steering wheel 13 connected thereto. Such wheel 13 is adapted to be turned in either direction, as usual, to effect steering of the automobile or other vehicle through the turning of the post 12.

In accordance with my invention, movement of the wheel 13 is also adapted to apply the brakes of the automobile, either the brakes of two or four wheels, or a brake applied to the transmission shaft of the vehicle, or otherwise as preferred, such wheel 13, for this purpose, being movable on an axis parallel to the ground or axes of rotation of the wheels of the automobile and specifically shown as bolts or the equivalent at 14.

About the axis 14, a four bushing pivotal joint is provided. This joint specifically has bushing sections 15 and 16, which are pivotally connected together by said bolts 14 and which sections, respectively, are interfitted with sections 11a and 11b, constituting the steering column 11, being fastened in place by binding screws at 17 and 18, respectively. About the joint thus produced, protector sections 19 are disposed, being engageable at spherical walls 20 and having collars at one end as at 21, secured in place by screws 22 to the said sections 15 and 16, screws 22 permitting loosening of the guards or shields 19, to permit access to the parts as for inspection, replacement or repair.

The steering post 12 is also in sections as at 12a and 12b, joined by screws 24 coaxial with the bolts 14.

Through the steering post 12, the usual wires or parts associated with the horn may pass to the button 25, and the light switch rod 26 and any equivalent part may also pass through said steering post. Said light switch rod 26 may be in sections as shown in Figure 3 pivoted together at 26a, coaxial with the bolts 14 and screws 24.

Fastened rigidly to the steering column section 11b is an arm 27 having a link or pitman 28 pivoted thereto at 29 and which in turn is pivoted as at 30 to a bell crank lever 31, pivoted to a bracket 32, suitably fastened on the steering column section 11a. The other end of bell crank lever 31 is pivotally connected at 31' to a pitman or rod 33 operatively connected to brake mechanism 34, which may be part of a four wheel brake system, two wheel brake system, a transmission brake or any equivalent. Such brake mechanism 34 is normally held unapplied through the action of a contractile coil spring 35, connected to the lever 31 as in Figure 1.

In use, the wheel 13 may be turned as usual to steer the vehicle through the turning of the post 12. In addition, when it is desired to apply or release the brakes represented by the mechanism 34, the wheel 13 and section 11b of the steering column may be swung on the pivots 14, correspondingly swinging the adjacent mechanism. This movement is suggested in dotted lines in Figure 1. Through such movement, the brake mechanism 34 is applied through downward movement of the steering wheel 13, through the arm 27, link 28, lever 31, pitman 33 and mechanism 34. Such movement also tensions the spring 35 so that when the wheel 13 is permitted to return to its normal or full line position in Figure 1, the brakes will be released.

The movement of the parts is limited to the two extremes of movement by lugs or shoulders 36 and 37 formed on the bushing sections 15 and 16, the lug 36 limiting movement of the parts to normal position and the lug 37 limiting movement of the parts to brake applying position.

Various changes may be resorted to provided they fall within the spirit and scope of the invention.

I claim as my invention:

1. In combination with a steering post comprising sections pivotally connected together, a column about said post comprising sections pivoted together, an arm extending from one of the sections of the column, means operable through movement of the arm to apply braking mechanism, and spring means normally maintaining the post and column sections in operative position for steering and disposed for tensioning through the last mentioned movement so as to restore said sections upon release, to the last mentioned position.

2. In combination with a steering post comprising sections pivotally connected together, a column about said post comprising sections pivoted together, an arm extending from one of the sections of the column, means operable through movement of the arm to apply braking mechanism, a bracket on the other steering column section, part of said means being connected to the braket.

3. In combination with a steering post comprising sections pivotally connected together, a column about said post comprising sections pivoted together, an arm extending from one of the sections of the column, means operable through movement of the arm to apply braking mechanism, a bracket on the other steering column section, part of said means being connected to the bracket, the steering column sections at the pivots consisting of bushings pivoted together, said bushings being interfitted with the adjacent steering column sections and fastened thereto, means on the bushings limiting movement of the parts to normal position and to brake applying position, and shield members on said sections about the joints.

WALTER W. GILBERT.